(12) United States Patent
Oh

(10) Patent No.: US 12,139,123 B2
(45) Date of Patent: Nov. 12, 2024

(54) METHOD FOR CONTROLLING BRAKING OF VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 101 days.

(21) Appl. No.: 18/071,375

(22) Filed: Nov. 29, 2022

(65) Prior Publication Data
US 2023/0406274 A1    Dec. 21, 2023

(30) Foreign Application Priority Data
Jun. 16, 2022    (KR) .......................... 10-2022-0073361

(51) Int. Cl.
*B60T 8/00*    (2006.01)
*B60T 8/172*    (2006.01)
*B60T 8/1761*    (2006.01)

(52) U.S. Cl.
CPC .......... *B60T 8/172* (2013.01); *B60T 8/17616* (2013.01); *B60T 2230/04* (2013.01); *B60T 2260/06* (2013.01)

(58) Field of Classification Search
CPC .... B60T 8/172; B60T 8/17616; B60T 8/1755; B60T 8/175555; B60T 2230/04; B60T 2260/06; B60W 30/18172; B60W 10/184; B60W 40/11; B60W 40/12; B60W 50/00; B60W 2050/0052; B60W 2050/0008; B60W 2510/22; B60W 10/18; B60W 10/22; B60G 17/0164; B60G 2600/09; B60G 2800/014
See application file for complete search history.

(56) References Cited

U.S. PATENT DOCUMENTS

| | | | |
|---|---|---|---|
| 10,131,331 B2* | 11/2018 | Monzaki | B60T 8/171 |
| 2015/0039199 A1* | 2/2015 | Kikuchi | B60T 8/17555 701/70 |
| 2016/0304068 A1* | 10/2016 | Monzaki | B60T 8/171 |

(Continued)

*Primary Examiner* — Phutthiwat Wongwian
*Assistant Examiner* — Sherman D Manley
(74) *Attorney, Agent, or Firm* — Morgan, Lewis & Bockius LLP

(57) ABSTRACT

A method for controlling braking of a vehicle includes determining a natural frequency of a vehicle suspension pitch motion according to characteristics of a suspension, providing a first filter configured to remove or decrease the natural frequency component of the vehicle suspension pitch motion and a second filter configured to extract or increase the natural frequency component of the vehicle suspension pitch motion, determining a total requested braking force command based on vehicle driving information collected while the vehicle is driven, determining a post-filter application total braking force command through a processing procedure by the first filter, determining a braking force compensation amount through a processing procedure by the second filter, and compensating for the post-filter application total braking force command using the braking force compensation amount, and controlling a braking force, which is applied to a wheel, using the post-compensation total braking force command.

19 Claims, 11 Drawing Sheets

(56) References Cited

U.S. PATENT DOCUMENTS

| | | | | |
|---|---|---|---|---|
| 2018/0273045 A1* | 9/2018 | Herrera | ............... | B60W 40/11 |
| 2019/0389317 A1* | 12/2019 | Oh | ............... | B60L 15/20 |
| 2022/0227338 A1* | 7/2022 | Patheja | ............... | B60W 10/18 |
| 2022/0388485 A1* | 12/2022 | Hirao | ............... | B60W 40/114 |

\* cited by examiner

METHOD FOR CONTROLLING BRAKING OF VEHICLE

CROSS REFERENCE TO RELATED APPLICATION

The present application claims priority to Korean Patent Application No. 10-2022-0073361, filed Jun. 16, 2022, the entire contents of which is incorporated herein for all purposes by this reference.

BACKGROUND OF THE PRESENT DISCLOSURE

Field of the Present Disclosure

The present disclosure relates to a method for controlling braking of a vehicle, and more particularly, to a method that can solve the problem of repeated wheel slip and deterioration of wheel slip control performance due to longitudinal load movement by controlling the braking force of a vehicle by reflecting first a pitch motion characteristic and longitudinal load movement information of the vehicle in real time.

Description of Related Art

Recently, even though various electronic control units are used for vehicles, the motions of vehicles are limited finally due to the limitation of road surface friction. This is because motions of vehicles depend on the friction force between a road surface and tires. Accordingly, how effectively friction may be used is an important factor that determines motions of vehicles.

To effectively use friction force, it is important to control the driving force and the braking force of wheels not to exceed the friction force that a road surface can provide. The friction force that a road surface can provide is generally influenced by the characteristics of the road surface, the amounts of longitudinal/lateral slips of tires, a vertical load on tires, etc. The vertical load on tires of these factors may be considered as the factor that most directly influences road surface friction force.

In general, it has been known that electronic control units such as an Anti-lock Braking System (ABS) and a Traction Control System (TCS) are used as a method of using friction force to limit a tire slip. However, the control types such as an ABS and a TCS have a defect that the slip control performance is not effective due to problems such as vehicle speed signal processing for preventing a control cycle delay or misoperation.

Furthermore, a longitudinal motion of a vehicle depends on driving forces for acceleration and deceleration, which is necessarily accompanied by a pitch motion due to the suspension of a vehicle. Because the strategies for controlling a driving force has not considered a pitch motion in detail up to now, a pitch motion is passively generated in accordance with the amount of a driving force unless specific active suspension control is applied.

Recently, according to the tendency of a wheel slip control strategy in electric vehicles, many methods of using the torque and speed of a motor based on quick behavior of the motor rather than using a vehicle body reference speed and a wheel speed are provided.

This strategy has an advantage that an absolute speed or a reference speed of a vehicle is not required, so that the strategy may be effective in an e-Four Wheel Drive (4WD) system. However, there may be a limitation that a situation requiring driving force reduction control is repeated due to a limitation of feedback control unless control that reflects, in advance, a suspension pitch motion (pitch motion) and vertical load information of tires which depends on the suspension pitch motion is performed.

For example, when a front wheel-driving force is generated, a pitch angle of a vehicle increases and a front wheel-vertical load decreases, whereby tire slip may occur at the front wheels. In the instant case, when a TCS operates and decreases the front wheel-driving force, the tire slip amount of the front wheels decreases and the pitch angle of the vehicle decreases, whereby front wheel-vertical force may be secured back. However, when the front wheel-driving force increases again, the pitch angle increases again and the vertical load on the front wheels decreases again, so tire slip may occur again at the front wheels.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method that can solve the problem of repeated wheel slip and deterioration of wheel slip control performance due to longitudinal load movement by controlling the driving force of a vehicle by reflecting first a pitch motion characteristic and longitudinal load movement information of the vehicle in real time.

Another objective of the present disclosure is to provide a method that can limit or control a grip limitation variation due to a pitch motion or load movement which may be generated in a vehicle through a method of correcting a braking force command in advance. In more detail, the objective of the present disclosure is to provide a filter-based feedforward/feedback control method that can determine and compensate for a braking force command for considering a pitch motion.

The objectives of the present disclosure are not limited to those described above and other objectives not stated herein would be apparently understood by those who have ordinary skills in the art that the present disclosure belongs to (hereafter, "those skilled in the art") from the following description.

To achieve the objectives, according to an exemplary embodiment of the present disclosure, there is provided a method for controlling braking of a vehicle that includes: determining a natural frequency of a vehicle suspension pitch motion according to characteristics of a suspension of the vehicle; providing a first filter configured to remove or decrease the natural frequency component of the vehicle suspension pitch motion and a second filter configured to extract or increase the natural frequency component of the vehicle suspension pitch motion to a controller of the vehicle; determining, by the controller, a total requested braking force command based on vehicle driving information collected while the vehicle is driven; determining, by the controller, a post-filter application total braking force command through a processing procedure by the first filter including the determined total requested braking force command as input thereof; determining, by the controller, a braking force compensation amount through a processing procedure by the second filter including a feedback braking force, which is a feedback value of a braking force of the vehicle, as input thereof; and compensating, by the controller, for the post-filter application total braking force command using the braking force compensation amount, and controlling a braking force, which is applied to a wheel of the vehicle by a braking device of the vehicle, using the post-compensation total braking force command.

According to another aspect of the present disclosure, there is provided a method for controlling braking of a vehicle that includes: determining a natural frequency of a vehicle suspension pitch motion according to characteristics of a suspension of the vehicle; providing a first transfer function model configured to remove or decrease the natural frequency component of the vehicle suspension pitch motion and a second transfer function model configured to extract or increase the natural frequency component of the vehicle suspension pitch motion to a controller of the vehicle; determining, by the controller, a total requested braking force command based on vehicle driving information collected while the vehicle is driven; determining, by the controller, a post-transfer function model application total braking force command through a processing procedure by the first transfer function model including the determined total requested braking force command as input thereof; determining, by the controller, a braking force compensation amount through a processing procedure by the second transfer function model including a feedback braking force, which is a feedback value of a braking force of the vehicle, as input thereof; and compensating, by the controller, for the post-transfer function model application total braking force command using the braking force compensation amount, and controlling a braking force, which is applied to a wheel of the vehicle by a braking device of the vehicle, using the post-compensation total braking force command.

Therefore, according to the method of controlling braking of a vehicle, it is possible to effectively prevent a wheel slip by only applying a software-related method without changing the hardware or increasing the manufacturing cost of a vehicle and it is possible to increase durability of tires through prevention of a wheel slip. Furthermore, it is possible to achieve an effect of improving braking performance of a vehicle by maximally using suspension pitch motion limit traction and an effect of improving riding comfort by attenuating a suspension pitch motion.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
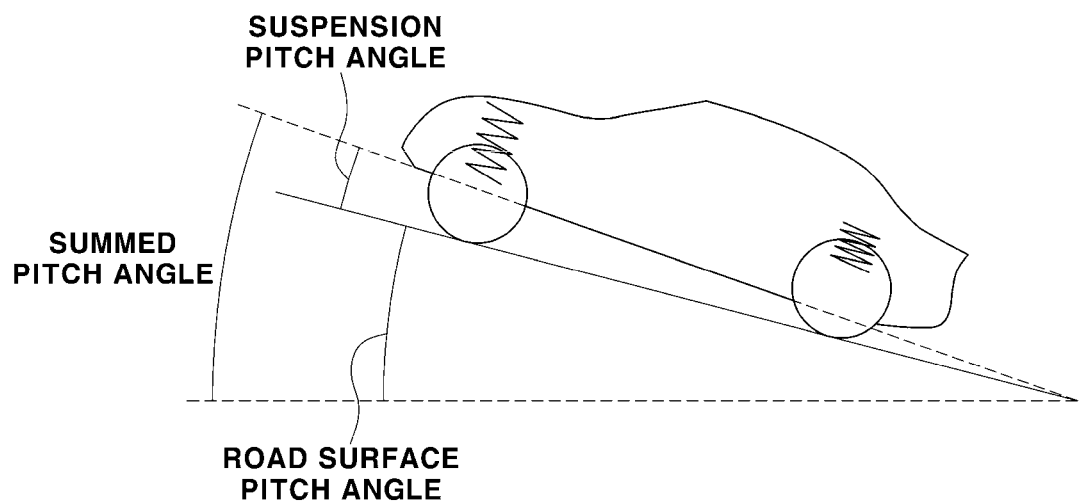
FIG. 1 is a diagram illustrating a pitch angle of a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Embodiments of the present disclosure will be described hereafter in detail with reference to the accompanying drawings. Description of specific structures and functions included in embodiments of the present disclosure are only an example illustrating the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless stated in the sentences. The terms "comprise" and/or "comprising" used herein do not exclude that another component, step, operation, and/or element exist or are added in the stated component, step, operation, and/or element.

The present disclosure relates to a method for controlling braking of a vehicle, and that is, provides a method that can solve the problem of repeated wheel slip and deterioration of wheel slip control performance due to longitudinal load movement by controlling the driving force of a vehicle by reflecting first a pitch motion characteristic and longitudinal load movement information of the vehicle in real time.

In the present disclosure, information of a transfer function (TF) that determines and outputs state information related to a pitch motion of a vehicle using variables, which show the driving state of the vehicle, as input is used to control a braking force which is applied to wheels by a braking device of the vehicle.

In an electrified vehicle in which a motor is used as a driving device (driving source) for driving the vehicle, a braking device includes a friction braking device and regenerative braking device. In a vehicle in which regenerative braking is performed, a total required braking force of the vehicle is satisfied by the sum of a friction braking force and a regenerative braking force.

A friction braking force is a force by a friction force acting on a wheel by a friction braking device and a regenerative braking force is a force by regenerative braking torque acting on driving wheels by a motor. The motor is a driving device that generates a driving force for driving a vehicle, but is also a component of regenerative braking device configured for generating a regenerative braking force together with an inverter.

In the present disclosure, braking control may include controlling friction braking by a friction braking device in addition to regenerative braking by a motor, and controlling of the regenerative braking may be performed by controlling the operation and output of a motor which is a driving device.

For reference, in the following description, terms "braking force" and "braking force command" may be replaced with "braking torque" and 'braking torque command", respectively. Furthermore, in the following description, terms "regenerative braking force" and "regenerative braking force command" may be replaced with "regenerative braking torque" and "regenerative braking torque command", respectively, and terms "friction braking force" and "friction braking force command" may be replaced with "friction braking torque" and "friction braking torque command", respectively.

The fundamental concept of the method of controlling braking according to an exemplary embodiment of the present disclosure is to use state and characteristic information related to a pitch motion of a vehicle. As the braking control method for suppressing a wheel slip generally, a feedback type that compensates for a braking force after a wheel slip is generated was generally used.

However, in the present disclosure, the magnitude of a driving force is adjusted to correspond to a pitch motion in real time using state and characteristic information related to a pitch motion of a vehicle, for example, change information of a vertical load before a wheel slip is generated.

A tire vertical load and a pitch angle of a vehicle may be exemplified as the state and characteristic information related to a pitch motion of a vehicle, and the tire vertical load of the information is a factor that the most directly determines the limit of traction between a road surface and a tire. The larger the tire vertical load, the larger the available traction, so a wheel slip is difficult to be generated. Furthermore, the smaller the tire vertical load, the smaller the available traction, which is vulnerable to generation of a wheel slip.

There are many reasons that change the tire vertical load and it is difficult to control a braking force in consideration of all changes including even a change due to external disturbance. Accordingly, a change of the tire vertical load due to at least a braking force itself may be considered in a braking control process except for a change due to external disturbance.

When a braking force is generated in a vehicle, pitch moment is generated due to the difference between the center of gravity and the center of pitch of the vehicle, and a pitch motion of the vehicle increases. In the instant case, a pitch angle is generated by the dynamic characteristics of a suspension and a vehicle body.

In general, a pitch angle increases when a vehicle is accelerated, and the vehicle state in the case is called a noseup motion or a squat state. The pitch angle decreases when a vehicle is decelerated, and this is called a nosedown motion or a dive state.

When a pitch motion of a vehicle is generated, the suspension of a vehicle contracts or extends, and accordingly, the spring or the damper of the suspension is deformed, which results in influence on the tire vertical load.

In the present disclosure, a pitch motion considers only a suspension pitch angle except for a road surface pitch angle, and the definition of the suspension pitch angle is shown in FIG. 1. FIG. 1 is a diagram illustrating a pitch angle of a vehicle.

As shown in the figure, a pitch angle of a vehicle may be classified into a suspension pitch angle and a road surface pitch angle, and the sum of the suspension pitch angle (absolute value) and the road surface pitch angle (absolute value) may be defined as a total pitch angle.

A suspension angle when front wheel suspensions further rebound (extend) in comparison to rear suspensions due to a stroke difference between the front wheel suspensions and the rear wheel suspensions and when the rear wheel suspensions further bump (contract) in comparison to the front wheel suspensions may be defined as a positive (+) suspension pitch angle. The suspension pitch angle in the state of a vehicle exemplified in FIG. 1 is a positive value.

The road surface pitch angle corresponds to the longitudinal slope of a vehicle due to the slope of a road surface, and the suspension pitch angle is the longitudinal (pitch-directional) slope of a vehicle due to extension or contraction of the front and rear wheel suspensions. A road surface pitch angle of common vehicles (a road gradient) may be detected through a longitudinal acceleration sensor.

Information related to a suspension pitch angle (suspension pitch angle information) of a vehicle shown in FIG. 1 is information showing a pitch direction vibration state of the vehicle due to a stroke change of the front wheel suspensions and the rear wheel suspensions while the vehicle is driven, and may be obtained through a sensor on a suspension or may be estimated based on information collected through sensors, etc. In the vehicle.

A method of obtaining suspension pitch angle information through a sensor at a suspension of a vehicle is well known in the art. For example, it is possible to determine suspension pitch angle information of a vehicle by comparing the positions of front wheels and rear wheels using position sensors of front wheel suspensions and position sensors of rear wheel suspensions based on signals from the position sensors.

The method of estimating suspension pitch angle information is also a well-known technology. That is, a method of obtaining a pitch angle by integrating signals of a pitch rate sensor or kinematically estimating a pitch angle based on a longitudinal or vertical acceleration sensor value has been known in the art.

Furthermore, a method of estimating a pitch angle through a suspension model-based observer, a method of determining a pitch angle through a wheel speed and driving force (or braking force) information model, a method of observing pitch angle information in a sensor fusion type by combining these method, etc. have been known in the art.

A suspension pitch angle shows a positive (+) value direction in the vehicle state shown in FIG. 1, in which the vehicle may be considered as in a squat state with respect to the suspension pitch angle. When a suspension pitch angle shows a negative (−) value direction, opposite to FIG. 1, the vehicle may be considered as in a dive state based on the suspension pitch angle.

Because the vehicle shown in FIG. 1 is in a state in which the vehicle body is inclined backward, it may be considered as a squat state based on the vehicle body. When a vehicle is in a squat state based on the vehicle body (a vehicle body squat state), it may mean that the vehicle body is inclined backward with respect to the horizontal line (inclination angle 0°).

A state in which a vehicle body is inclined forward may be considered as a dive state based on the vehicle body, and a vehicle body dive state may be considered as a state in which the vehicle body is inclined forward with respect to the horizontal line. As described above, a squat state may be induced based on the suspension pitch angle when the vehicle is accelerated, and a vehicle dive state may be induced based on the suspension pitch angle when the vehicle is decelerated.

A change of a vehicle suspension pitch motion or longitudinal load movement of a vehicle due to a state change of a suspension depends on a characteristic determined by inherent suspension setting of a vehicle (suspension characteristic of a vehicle). The setting includes all of spring rigidity, a damping ability, bushing rigidity, the geometry of suspension arms, etc. of a suspension.

Suspension pitch motions of a vehicle such as dive (nosedown)/squat (noseup) due to these characteristics are generated while showing a feature determined by the setting, in which the feature means a motion including a specific natural frequency.

Accordingly, the principle of the present disclosure is to generate a braking force command that maximally does not increase a suspension pitch motion or longitudinal load movement of a vehicle by modeling a suspension pitch motion or longitudinal load movement of the vehicle which is determined by setting and characteristics of suspensions of the vehicle and by removing a frequency component corresponding to the natural frequency of the model from a braking force command using a filter, and to suppress a pitch motion and load movement of the vehicle and simultaneously prevent a wheel slip by controlling braking of the vehicle using the braking force command.

Figure 2:
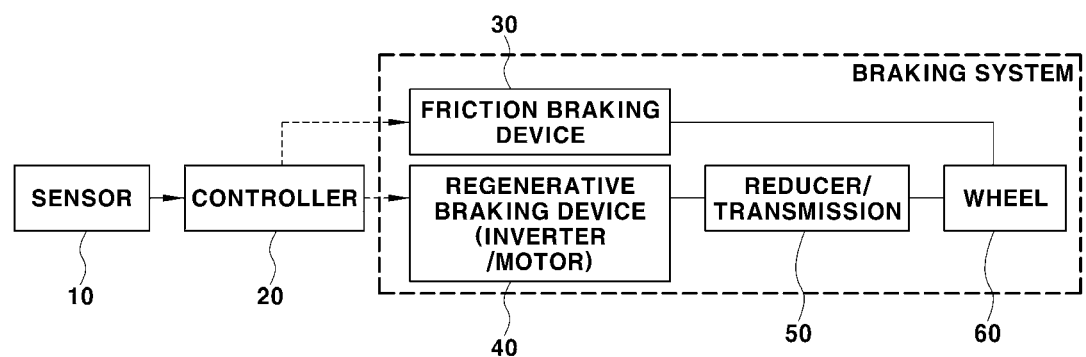
FIG. 2 is a block diagram showing the configuration of a system that performs braking control according to an exemplary embodiment of the present disclosure.
Figure 3:
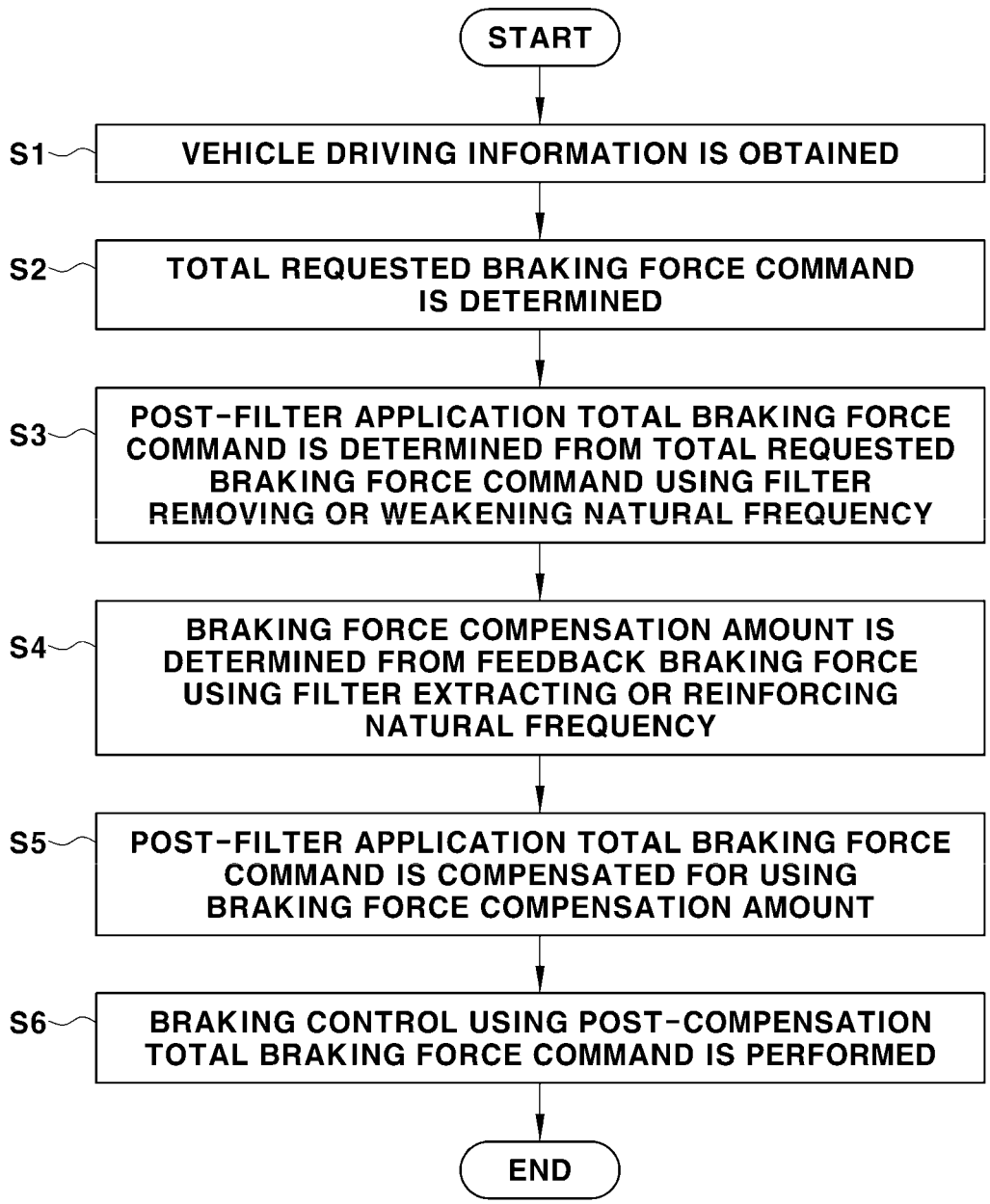
FIG. 3 is a flowchart showing a braking control process in a vehicle according to an exemplary embodiment of the present disclosure.

Hereafter, a method for controlling braking according to an exemplary embodiment of the present disclosure is described in detail together with a system that performs braking control. FIG. 2 is a block diagram showing the configuration of a system that performs braking control according to an exemplary embodiment of the present disclosure and FIG. 3 is a flowchart showing a process of controlling braking of a vehicle according to an exemplary embodiment of the present disclosure including steps A1, S2, S3, S4, S5 and S6.

Figure 4:
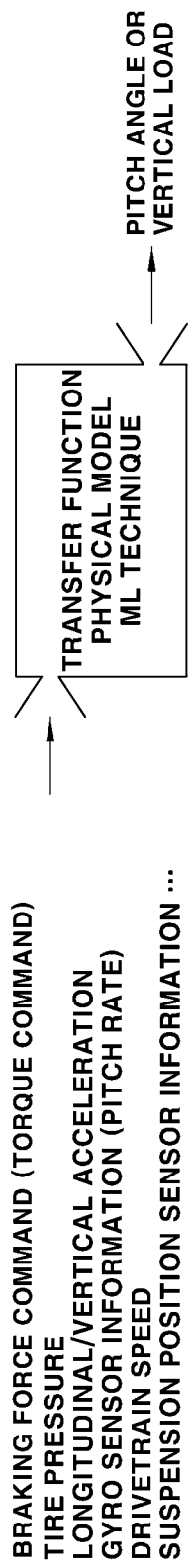
FIG. 4 is a diagram showing that a pitch angle or a vertical load may be determined using a transfer function in an exemplary embodiment of the present disclosure.
Figure 5:
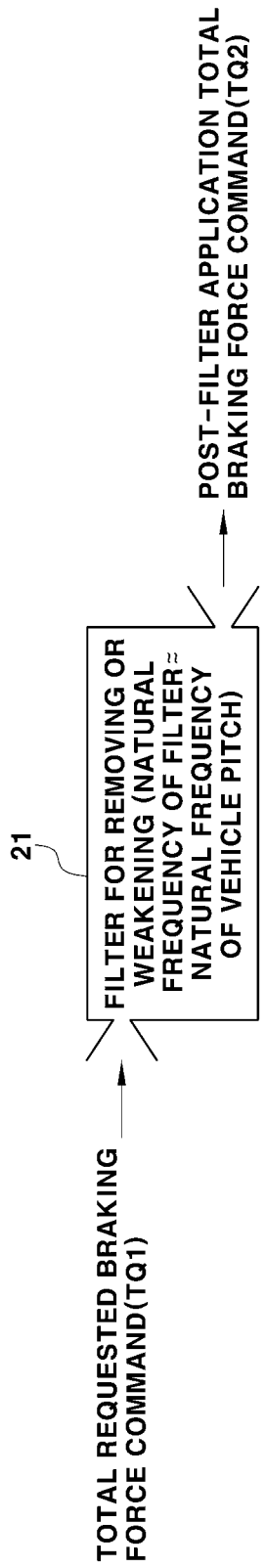
FIG. 5 is a block diagram showing input and output of a filter that removes or weakens a natural frequency in an exemplary embodiment of the present disclosure.

FIG. 4 is a diagram showing that a pitch angle or a vertical load may be determined using a transfer function in an exemplary embodiment of the present disclosure and FIG. 5 is a block diagram showing input and output of a first filter which is a filter removing or weakening a natural frequency in an exemplary embodiment of the present disclosure.

Figure 6:
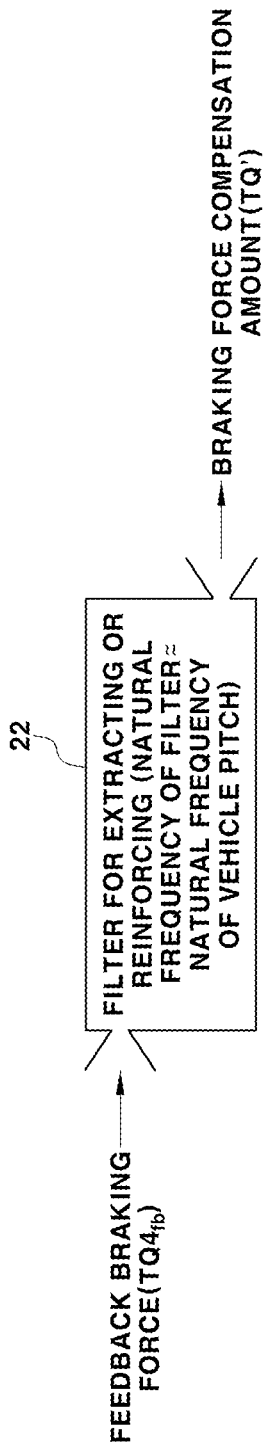
FIG. 6 is a block diagram showing input and output of a filter that extracts or reinforces a natural frequency in an exemplary embodiment of the present disclosure.
Figure 7:
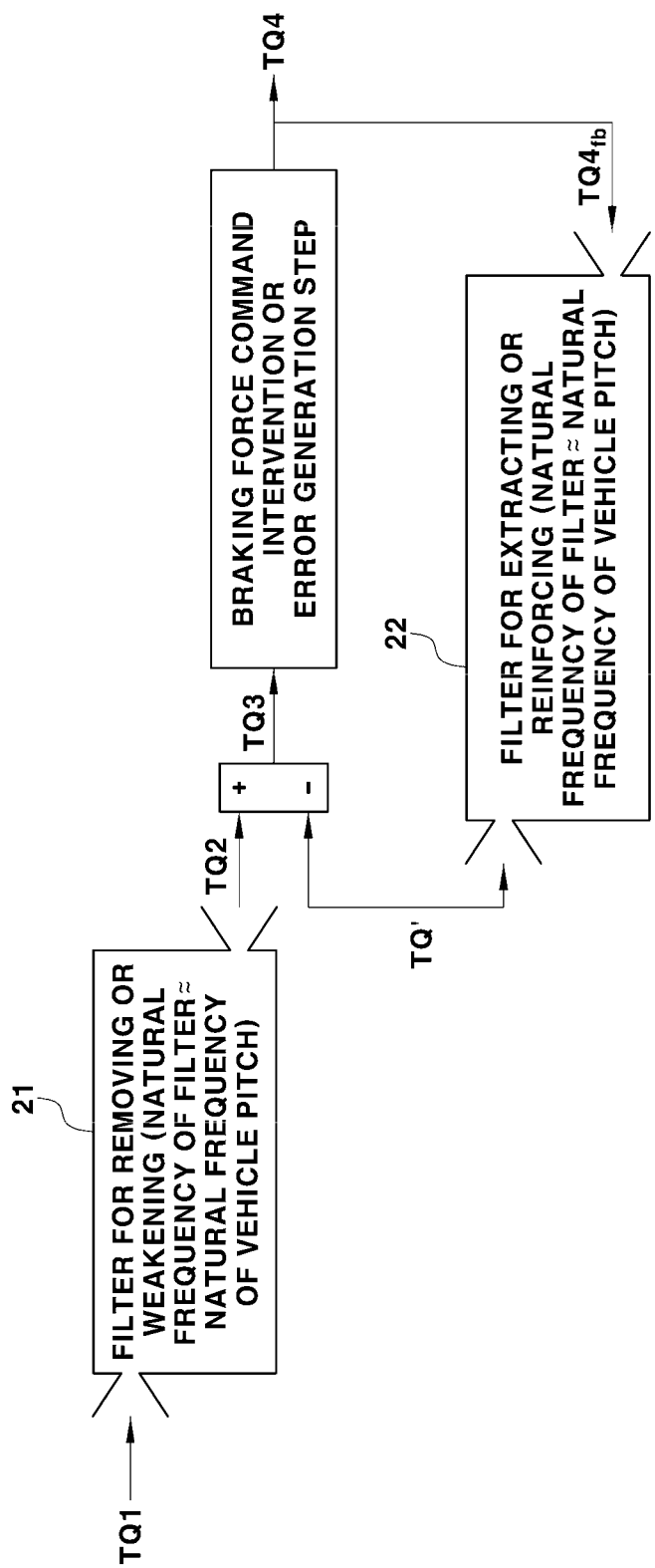
FIG. 7 is a block diagram showing the entire process of including correction and compensation amount determination of a braking force command, compensation of a braking force command, command intervention, and error generation.

FIG. 6 is a block diagram showing input and output of a second filter which is a filter extracting or reinforcing a natural frequency in an exemplary embodiment of the present disclosure and FIG. 7 is a block diagram showing the entire process of including correction and compensation amount determination of a braking force command, compensation of a braking force command, torque command intervention, and error generation.

First, referring to FIG. 2, a system that performs braking control according to an exemplary embodiment of the present disclosure includes a controller 20 that determines a total braking force command from vehicle driving information (steps S1 and S2 in FIG. 3) and performs braking control of a vehicle using the determined total braking force command, a friction braking device 30 that generates a friction braking force for a wheel 60 in accordance with a friction braking force command received from the controller 20, and a regenerative braking device 40 that generates a regenerative braking force for the wheel 60 in accordance with a regenerative braking force command received from the controller 20.

The regenerative braking device 40 includes a motor which is a driving device (driving source) configured to drive a vehicle and generates a regenerative braking force for the wheel 60, and an inverter configured to drive and control the motor.

Referring to FIG. 2, a reducer (or a transmission) 50 connected to an output side of the motor and a wheel 60 connected to the motor to be configured to transmit power are shown, and it may be seen that the wheel 60 is connected to the motor of the regenerative braking device 40 through the reducer (or the transmission) 50 to be configured to transmit power.

The wheel 60 to which a regenerative braking force is applied by the regenerative braking device 40 in a vehicle is a driving wheel which is connected to the motor to be configured to transmit power. For example, the driving wheel may be a rear wheel of a vehicle. The wheel 60 to which a friction braking force is applied by the friction braking device 30 may be a driving wheel or may be a driven wheel rather than a driving wheel.

In the present disclosure, the term 'total braking force command' means, when there are several braking devices including the friction braking device 30 and the regenerative braking device 40 in a vehicle, an command which is the sum of braking force commands of the several braking devices, and may mean a total braking force command before a braking force is distributed into a friction braking force and a regenerative braking force.

In the following description, a total braking force command, which is initially obtained based on vehicle driving information in real time by the controller 20 without any filter and any compensation while the vehicle is driven, is referred to as a 'total requested braking force command'. 'TQ1' is a total requested braking force command in FIG. 5 and FIG. 7.

In the present disclosure, a method of determining a total requested braking force command from real-time vehicle driving information (steps S1 and S2 in FIG. 3) is similar to well-known methods of determining a total braking force command based on vehicle driving information of general vehicles.

A method of distributing a total braking force, which has not been distributed yet, into a friction braking force and regenerative braking force is also similar to a well-known braking force distribution method which is performed in general vehicles.

The controller 20 is configured to control a first filter 21 which is applied to a total requested braking force command, and the controller 20 corrects a total requested braking force command by applying the first filter 21 to the total requested braking force command (step S3 in FIG. 3). In the following description, a total braking force command obtained by applying the first filter 21 to a total requested braking force command is referred to as a 'post-filter application total braking force command'. 'TQ2' is a post-filter application total braking force command in FIG. 5 and FIG. 7.

The controller 20 further includes a second filter 22 including a feedback braking force $TQ4_{fb}$, which is a feedback value, as input and including a braking force compensation amount TQ' as an output for a final total braking force which is applied to the wheel 60.

In the following description, a final total braking force which is actually applied to the wheel 60 by a braking device of a vehicle and a final total braking force command for the braking device are referred to as a 'final total braking force' and a 'final total braking force command', respectively. In FIG. 6 and FIG. 7, 'TQ4' is a final total braking force which is a current final control result or a final total braking force command of a current control cycle.

In FIG. 6 and FIG. 7, '$TQ4_{fb}$' is a feedback value of a final total braking force TQ4 or a final total braking force command which is used as input of the second filter 22 to determine a braking force compensation amount TQ' (step S4 in FIG. 3), and in the following description, the feedback value of a final total braking force or a final total braking force command which is used as input of the second filter 22 is referred to as a 'feedback braking force'.

The difference between TQ4 which is a final total braking force (or a final total braking force command) and $TQ4_{fb}$ which is a feedback braking force is only whether they are current final control result values (or final control values) or feedback values for the next control cycle.

When TQ4 is an command (final total braking force command) value which is a final control value, as in various exemplary embodiments to be described below, TQ4 is a final command value of a current control cycle, but is also $TQ4_{fb}$ which is input of the second filter 22 used for generating a braking force compensation amount at the next cycle and a feedback value (feedback braking force) for generating a braking force command TQ3 or TQ4.

The controller 20 determines a braking force compensation amount TQ' by applying the second filter 22 to the feedback braking force $TQ4_{fb}$ which is a feedback value of a final total braking force (final total braking force command) (step S4 in FIG. 3), and compensates for a total braking force command TQ2 using the braking force compensation amount TQ' after applying a filter corrected by the first filter 21 (step S5 in FIG. 3).

In the following description, the total braking force command obtained by compensating for a total braking force command TQ2 using a braking force compensation amount TQ' after applying a filter is referred to as a 'post-compensation total braking force command'. 'TQ3' is a post-compensation total braking force command in FIG. 6 and FIG. 7.

The configuration, function and use, a processing procedure, and operation and effects according to application of the first filter 21 and the second filter 22 will be described in detail below. The post-filter application total braking force command TQ2, the post-compensation total braking force command TQ3, the final total braking force TQ4, the feedback braking force $TQ4_{fb}$, and the braking force compensation amount TQ' will also be described again below.

Meanwhile, a total requested braking force command (that is determined by the controller 20 is determined and generated based on vehicle driving information collected in real time while a vehicle is driven (steps S1 and S2 in FIG. 3), and the vehicle driving information may be sensor detection information detected by a sensor 10 and then input to the controller 20 through a network of the vehicle.

The sensor 10 that detects vehicle driving information may include a Brake Pedal Sensor (BPS) that detects a brake pedal input value by a driver, a sensor which is configured to detect the speed of a drivetrain, and a sensor configured for detecting a vehicle speed.

The drivetrain speed may be the rotation speed of a driving device (a driving device speed), the rotation speed of the wheel 60 connected to the driving device to be configured to transmit power (a wheel speed or a driving wheel speed), or the rotation speed of a driveshaft (a driveshaft speed).

The driving device is the motor of the components of the regenerative braking device 40 and the rotation speed of the driving device may be the rotation speed of the motor (motor speed). The sensor that detects the drivetrain speed may be a sensor which is configured to detect a motor speed, which may be a resolver that detects the position of the rotor of a motor. Alternatively, the sensor which is configured to detect the drivetrain speed may be a wheel speed sensor which is configured to detect the rotation speed of a driving wheel (a wheel speed) or a sensor which is configured to detect the rotation speed of a driveshaft.

The sensor which is configured to detect a vehicle speed may also be a wheel speed sensor. It is well known in the field of the art that vehicle speed information is obtained from a signal of the wheel speed sensor, so it is not described in detail.

As vehicle driving information which is detected by the sensor 10 for the controller 20 to determine a total requested braking force command, a brake pedal input value (BPS value) by a driver, the speed (rotation speed) of a driving device, a vehicle speed, etc. may be selectively used. In the vehicle driving information, the brake pedal input value may be driving input information by a driver, and the speed of the driving device and the vehicle speed may be vehicle state information.

Alternatively, the vehicle driving information may be information which is determined by the controller 20 itself or may be information (e.g., total requested braking force information) which is input to the controller 20 through the vehicle network from another controller (e.g., an ADAS controller) in the vehicle.

In an exemplary embodiment of the present disclosure, the sensor 10 may further include a sensor of a suspension for obtaining suspension pitch angle information. The sensor of a suspension for obtaining suspension pitch angle information may include a position sensor of a front wheel suspension and a position sensor of a rear wheel suspension.

As described above, a method of obtaining suspension pitch angle information through a sensor of a suspension is well-known in the art. For example, it is possible to determine suspension pitch angle information of a vehicle by comparing the positions of the front wheels and the rear wheels based on signals from the position sensors.

Furthermore, as described above, a suspension pitch angle, etc. may be obtained through an estimation process determined based on information collected from a vehicle through sensors, and the estimation method is well known to those skilled in the art, so it is not described in detail.

Meanwhile, a suspension pitch motion of a vehicle is generated in a noseup (dive) direction while the vehicle is decelerated, and in the instant case, the load on the vehicle moves forward thereof. Accordingly, in comparison to when a load is in a neutral state (stop state), the vertical load on the front wheel shaft increases and a wheel slip does not easily occur, and the vertical load on the rear wheel shaft decreases and a wheel slip easily occurs. Accordingly, control of removing a natural frequency component of the pitch motion from a total braking force command may be performed to prevent rear wheel slip and rear wheel lock.

In consideration of the present situation, a filter (natural frequency removal filter) or a transfer function model that can remove a natural frequency component of a vehicle suspension pitch motion is applied to a total requested braking force command to prevent rear wheel slip and rear wheel lock and maximize braking performance. In the instant case, the filter is the first filter 21 described above, and the first filter 21 is provided in the controller 20 so that a natural frequency is a value that is the same as or close to the natural frequency of the vehicle suspension pitch motion.

In an exemplary embodiment of the present disclosure, transfer function models including the same functions, respectively, as the first filter 21 which is applied to a total requested braking force command and the second filter 22 that utilizes a braking force compensation amount as an output may be used instead of the first filter 21 and the second filter 22, respectively. The first filter and the second filter may be replaced by transfer function models that perform the same functions, respectively, in the following description.

In an exemplary embodiment of the present disclosure, the first filter 21 removes or weakens (reduces) a frequency component in a specific band from a total requested braking force command which is input, and in the instant case, the natural frequency of the first filter may be set as a value which is the same as or close to the natural frequency of a suspension pitch motion of a vehicle. Weakening a frequency component in a specific band means reducing the frequency component in the specific band in the present disclosure.

Therefore, according to the first filter 22, it is possible to remove or weaken a natural frequency component of a suspension pitch motion according to a suspension characteristic of a vehicle from a total requested braking force command which is input. Furthermore, a braking force command in which a natural frequency component of a suspension pitch motion is removed or weakened (reduced) may be determined and output by the first filter 22.

To remove or weaken (reduce) a frequency component, which increases a suspension pitch motion of a vehicle, in a total requested braking force command using a filter, it is required first to find out the frequency characteristic of a suspension pitch motion of a vehicle to be controlled. This process may be performed by constructing various types of transfer functions.

In the present disclosure, information of a transfer function including a variable showing a vehicle driving state as input and including state information related to a suspension pitch motion of a vehicle as an output is used for braking control.

The information of a transfer function may be a natural frequency and the state information related to a suspension pitch motion which is the output of the transfer function may be suspension pitch angle information or tire vertical load information. The tire vertical load information may include a front wheel vertical load and a rear wheel vertical load.

In the present disclosure, the suspension pitch angle (hereafter, abbreviated as a 'pitch angle') or the tire vertical load (hereafter, abbreviated as a 'vertical load') may be determined using a transfer function, and an example of determining a pitch angle or a vertical load using a transfer function is described hereafter.

In the present disclosure, a transfer function is modeled and constructed to be able to determine state information related to a suspension pitch motion of a vehicle by use of a variable, which shows a vehicle driving state, as input thereof, and the state information related to a suspension pitch motion of a vehicle may be a pitch angle or a vertical load.

In an exemplary embodiment of the present disclosure, a transfer function may have the following form.

As shown in FIG. 4, a transfer function including braking force information (braking force command) as input and pitch angle information as an output or a transfer function including pitch angle information as input and vertical load information as an output may be constructed and used in the controller 20. The braking force information may be a total requested braking force command which is determined by the controller 20.

A total requested braking force command and a pitch angle which is input of the transfer function are also variable information showing a vehicle driving state and may be obtained from information which is detected by the sensor 10. It was described above that a total requested braking force command is determined from a sensor detection information and a pitch angle may be obtained from information detected by a suspension position sensor of the sensor 10.

Alternatively, a transfer function including braking force information as input and including a vertical load information as an output or a transfer function including tire pressure information detected by a tire pressure sensor of the sensor 10 as input and including vertical load information as an output may be constructed and used in the controller 20.

Alternatively, a transfer function including longitudinal or vertical acceleration information which is detected by a longitudinal acceleration sensor or a vertical acceleration sensor provided in a vehicle as input and including pitch angle or vertical load information as an output may be constructed and used in the controller 20.

Alternatively, a transfer function including a pitch angle change rate (a pitch rate, a pitch angle speed) information obtained by a gyro sensor (a pitch rate sensor) of the sensor 10 as input and including pitch angle or vertical load information as an output may be constructed and used in the controller.

Alternatively, a transfer function including a drivetrain speed as input and including pitch angle or vertical load information as an output may be constructed and used in the controller. The drivetrain speed may be a wheel speed, or a driving device speed (a motor speed), or a driveshaft speed which is detected by the sensor 10.

Alternatively, a transfer function including information detected by a suspension travel sensor as input and including pitch angle or vertical load information as an output may be constructed and used in the controller.

Alternatively, a transfer function including two or more of the items of information described above as input and including pitch angle or vertical load information as an output may be constructed and used in the controller.

The transfer function stated herein may be a transfer function set to determine a pitch angle or a vertical load using a data-based optimization technique, numerical solution, etc.

Alternatively, a physical model-based transfer function may be constructed and used and a learning technique for obtaining a transfer function may be used. Furthermore, algorithms including the input and output described above may be constructed using various machine learning techniques other than a transfer function.

Meanwhile, when a transfer function is constructed in the controller, that is, when a transfer function that can output pitch angle or vertical load information, which is state information related to a suspension pitch motion of a vehicle, using a variable showing a vehicle driving state as input is constructed in the controller, the natural frequency of the transfer may be determined. The transfer function in the instant case may show an inherent characteristic of the vehicle to which the method for controlling braking of the present disclosure is applied.

In the present disclosure, the natural frequency of a transfer function constructed to output state information related to a suspension pitch motion of a vehicle using a variable, which shows a vehicle driving state, as input may be considered as the natural frequency of suspension pitch motion vibration in a control target vehicle. It may be considered in the following description that the 'natural frequency of a transfer function' and the 'natural frequency of a vehicle suspension pitch motion' have the same meaning.

When a natural frequency of a vehicle suspension pitch motion, that is, a natural frequency of a transfer function constructed in advance is determined, as described above, a first filter 21 which is applied to a total requested braking force command and a second filter 22 that has a feedback braking force as input and has a braking force compensation amount as an output are configured and set in the controller 20 based on the determined natural frequency of the transfer function to control braking of a vehicle.

In the instant case, a first filter 21 that can remove or weaken (reduce) a frequency component corresponding to the natural frequency of the transfer function from a total requested braking force command (step S3 in FIG. 3) and a second filter 22 that can extract or reinforce (increase) a frequency component corresponding to the natural frequency of the transfer function from the feedback braking force may be constructed and set in the controller 20 (step S4 in FIG. 3). In an exemplary embodiment of the present disclosure, the first filter 21 and the second filter 22 may be filters configured and set by Laplace transfer functions.

As described above, suspension pitch information of a vehicle (state information related to a suspension pitch motion of a vehicle) such as pitch angle or vertical load information which is output of a transfer function constructed in the controller 20 of the vehicle to which the present disclosure is substantially applied may be used in various ways to control the vehicle. Furthermore, the natural frequency of the transfer function constructed in the controller of the vehicle may be used to design and configure a filter in the controller, as in the present disclosure.

Furthermore, rather than that a natural frequency is determined with a transfer function constructed in the controller 20 of a vehicle to which the present disclosure is substantially applied, the transfer function described above is constructed through a previous evaluation and test process performed in the step of developing the same kind of vehicle and then the natural frequency of the transfer function may be obtained. Furthermore, the first filter 21 and the second filter 22 designed using the natural frequency information obtained in the instant way may be substantially configured and set in a controller of mass-production vehicles and may be used to control braking.

Hereafter, the first filter and the second filter are described in more detail. FIG. 5 shows use of the first filter 21 that has a total requested braking force command TQ1 as input (step S3 in FIG. 3) and FIG. 6 shows use of a second filter 22 that has a feedback braking force $TQ4_{fb}$ as input and a braking force compensation amount TQ' as output (step S4 in FIG. 3).

In the present disclosure, a frequency component which is a specific frequency component of a transfer function and should be removed or weakened (reduced) through the first filter 21 may be the natural frequency component of a vehicle suspension pitch motion, and a total braking force command including a frequency component corresponding to the natural frequency of a vehicle suspension pitch motion increases the vehicle suspension pitch motion.

Accordingly, a removal target frequency that will be removed through the first filter 21 may be determined as the natural frequency of a vehicle suspension pitch motion and may be used to construct the first filter 21, and in the instant case, the natural frequency of the vehicle suspension pitch motion may be determined as the natural frequency of a transfer function including a pitch angle or a vertical load, which is state information related to the suspension pitch motion, as output, as described above.

In the present disclosure, a primary frequency at which a peck gain is generated when vehicle suspension pitch motion vibration is analyzed in a frequency domain (e.g., analyzed in a bode plot) may be determined as the natural frequency.

A braking force command including a frequency component corresponding to the natural frequency increases a vehicle suspension pitch motion, and accordingly, great longitudinal load movement (forward load movement of a vehicle) is also generated, so that the possibility of slip of wheels of which the traction decreases, slip of the rear wheels of a vehicle increases. Accordingly, a natural frequency component should be removed from a braking force command to reduce a wheel slip of a vehicle and attenuate a suspension pitch motion.

Accordingly, in the present disclosure, the information of a transfer function including state information of a suspension pitch motion of a vehicle as an output is used, and particular, the first filter 21 that can remove or weaken (reduce) the natural frequency component of a transfer function using natural frequency information of the transfer function showing the natural frequency of a vehicle suspension pitch motion is configured in the controller 20.

Furthermore, the first filter 21 which is a filter removing or weakening a natural frequency is used to handle the total requested braking force command TQ1 in the controller 20 (step S3 in FIG. 3), and the natural frequency component of a vehicle suspension pitch motion is removed or weakened from the total requested braking force command by applying the first filter 21 to the total requested braking force command TQ1 (see FIG. 5).

The first filter 21 may include a low pass filter or a high pass filter that has a cut-off frequency corresponding to the natural frequency of a transfer function of a suspension pitch motion, a notch filter (band stop filter, band removal filter) including a center frequency corresponding to a natural frequency, etc. It is possible to configure the first filter 21 by use of one of such filters or overlapping and using several of such filters.

The cut-off frequency of the low pass filter or the high pass filter or the center frequency of the notch filter may not be the same as the natural frequency of a removal target, but the first filter 21 is configured to remove or weaken a component, which corresponds to the natural frequency of the transfer function of a suspension pitch motion constructed in advance as described above, from a total requested braking force command, so an effective natural frequency band of the first filter 21 should be set to include the natural frequency of a vehicle suspension pitch motion.

However, considering an error range of a set natural frequency value, for the low pass filter, the natural frequency of a vehicle suspension pitch motion which is the natural frequency of a removal target should be set to be the same as or higher than the natural frequency of the filter.

Furthermore, for the high pass filter, the natural frequency of a vehicle suspension pitch motion should be set to be the same as or lower than the natural frequency of the filter, and for the notch filter, the natural frequency of a vehicle suspension pitch motion should exist in a stop bandwidth (notch bandwidth) of the filter.

A component corresponding to a natural frequency may be removed or weakened using multi-dimensional filters as the first filter besides the low pass filter, the high pass filter, and the notch filter. Furthermore, a filter may be replaced by a transfer function model, as described above, and it may be possible to design a filter using a transfer function itself constructed by modeling a real-time vertical load due to a suspension pitch motion or longitudinal load movement of a vehicle described above.

For example, it is assumed that a transfer function TF that derives a pitch angle (a squat angle φ) from an actual braking force command (torque command Tq) was constructed as in the following Equation 1.

$$TF = \frac{\phi}{Tq} = \frac{1}{c_1 s^2 + c_2 s + c_3}$$ [Equation 1]

In the instant case, it is possible to design and configure a filter based on a transfer function TF, as in the following Equation 2, and it is possible to use the filter to control braking of a vehicle by applying the filter to a braking force command in a controller.

$$1 - c_4 sTF - c_5 TF = 1 - \frac{c_4 s}{c_1 s^2 + c_2 s + c_3} - \frac{c_5}{c_1 s^2 + c_2 s + c_3}$$ [Equation 2]
$$= \frac{1}{c_1 s^2 + c_2 s + c_3}(c_1 s^2 + c_2 s + c_3 - c_4 s - c_5)$$
$$= \frac{c_1 s^2 + (c_2 - c_4)s + (c_3 - c_5)}{c_1 s^2 + c_2 s + c_3}$$

where $c_1$, $c_2$, $c_3$, $c_4$, $c_5$, etc. are coefficients which may be set (regardless of a positive value or a negative value), and s is a Laplace operator.

The first filter 21 was described above, and as shown in FIG. 5, the first filter 21 outputs a corrected total requested braking force command (that is, a 'post-filter application total braking force command') TQ2, in which the natural frequency component of a vehicle suspension pitch motion is removed or weakened, using a total requested braking force command TQ1 as input.

When only individual EV regenerative braking is performed in a vehicle, the total requested braking force commands TQ1 and TQ2 are regenerative braking torque commands (motor torque commands), and the total requested braking force commands TQ1 and TQ2 are the sums of a friction braking force and a regenerative braking force in complex braking in which friction braking and regenerative braking are simultaneously used. of course, in the complex braking, a regenerative braking force command obtained by subtracting the friction braking force command from the total braking force command is a motor torque command after relative amplification ratio and gear ratio, etc.

In general, because responsiveness when a regenerative braking force of a regenerative braking device that utilizes a motor is controlled is quick and excellent in comparison to responsiveness of a friction braking device, braking force compensation and control may be performed through a regenerative braking force of a motor rather than a friction braking device in the present disclosure.

Next, the configuration of the second filter 22, that is, a filter that can pass a specific frequency component, that is, the natural frequency component of a transfer function constructed in advance of a feedback braking force TQ4$_{fb}$ is described in more detail with reference to FIG. 6 (step S4 in FIG. 3).

A total braking force command obtained by removing or weakening the natural frequency component of a vehicle suspension pitch motion from the total requested braking force command TQ1 through the first filter 21, that is, the post-filter application total braking force command TQ2 is the most ideal braking force command for braking control of a vehicle.

However, the post-filter application total braking force command TQ2 may be different from a total braking force actually generated at the wheel 60 or a final total braking force command TQ4. The difference may be generated by incidental intervention of a braking device, an error of a braking force which is generated by a braking device, or the like, and is generated in some cases by variation of a torque command that additionally intervenes due to fail safety, a mode change, a learning logic, real-time calibration, chassis control, drivability adjustment, etc.

Accordingly, additional compensation is required after the first filter 21 is applied, and it is required to extract a component that should be compensated first to compensate a braking force command. Accordingly, the second filter 22 or a transfer function model that equally or similarly acts is required, and the second filter or the transfer function model determines a value by extracting or reinforcing (increasing) a signal component corresponding to the natural frequency of a vehicle suspension pitch motion in an input braking force command (feedback braking force $TQ4_{fb}$).

The reason that the present process is required is because it is possible to remove a corresponding command component from a total braking force command only when the natural frequency component of a vehicle suspension pitch motion is extracted. Accordingly, in the present disclosure, a braking force compensation amount is determined through a filter or a transfer function model that can pass a specific frequency component, that is, the natural frequency component of a vehicle suspension pitch motion.

The fact that the second filter 22 passes a natural frequency component means that a natural frequency component is extracted or reinforced (increased) in a feedback braking force. Accordingly, in the present disclosure, the second filter that passes a natural frequency component (that is, a natural frequency pass filter) may be considered as a filter that extracts or reinforces a natural frequency component (that is, a natural frequency extraction or reinforcement filter). Furthermore, in the present disclosure, reinforcing a natural frequency component means increasing a natural frequency component.

In the present disclosure, as a specific frequency component of a transfer function, a frequency component that passes through the second filter 22 may be the natural frequency component of a vehicle suspension pitch motion, and in the instant case, the natural frequency component of the transfer function and the natural frequency component of a vehicle suspension pitch motion are similar to those in the case of the first filter, so they are not described in detail.

The second filter 22 may be a low pass filter or a high pass filter that has a cut-off frequency corresponding to the natural frequency of a vehicle suspension pitch motion, a band pass filter including a center frequency corresponding to the natural frequency, or the like.

In the second filter 22, similarly, the cut-off frequency of a low pass filter or a high pass filter, or the center frequency of a band pass filter may not be the same as the natural frequency of a pass target.

However, for the low pass filter, the natural frequency of a vehicle suspension pitch motion should be set to be the same as or lower than the natural frequency of the filter, and for the high pass filter, the natural frequency of a vehicle suspension pitch motion should be set to be the same as or higher than the natural frequency of the filter. Furthermore, for the band pass filter, the natural frequency of a vehicle suspension pitch motion should be set to exist in the pass hand (pass bandwidth) of the filter.

When a transfer function model is used, the transfer function should pass (extract or reinforce) a specific frequency component, and in the instant case, the frequency band which is passed (extracted or reinforced) should include the natural frequency of a vehicle suspension pitch motion It may be possible to configure the second filter 22 that determines and outputs a braking force compensation amount TQ' using one filter or transfer function model described above, but it may also be possible to configure the second filter 22 using a plurality of filters of transfer function models.

When a plurality of filters or transfer function models is used, it is possible to use all of braking force compensation amounts, which are obtained through the filters or the transfer function models, in a compensation process by connecting the filters or the transfer function models in parallel in the second filter 22.

In the instant case, a final braking force compensation amount TQ' may be obtained by applying a preset gain value to the braking force compensation amounts obtained in parallel and then summing up all of the braking force compensation amounts to which the gain has been applied. A post-filter application total braking force command TQ2 which is output of the first filter 21 is compensated using the total braking force compensation amount TQ', whereby a post-compensation total braking force command TQ3 is generated.

Furthermore, it is also possible to reinforce a component corresponding to a natural frequency using a multi-dimensional filter besides a high pass filter or a band pass filter. Furthermore, a filter may be designed using a transfer function itself constructed by modeling a real-time vertical load due to the suspension pitch motion of a vehicle or longitudinal load movement described above.

For example, it is assumed that a transfer function TF that derives a pitch angle (a squat angle φ) from a feedback braking force (which is a braking force command or an actual braking force) was constructed as in the following Equation 3. Tq is a torque command in Equation 3 and the present torque command is a feedback braking force $TQ4_{fb}$.

$$TF = \frac{\phi}{Tq} = \frac{1}{c_1 s^2 + c_2 s + c_3} \quad \text{[Equation 3]}$$

In the instant case, it is possible to design and configure a filter based on a transfer function TF, as in the following Equation 4, and it is possible to use the filter to control braking of a vehicle by applying the filter to a braking force command in a controller.

$$c_4 s TF + c_5 TF = \frac{c_4 s}{c_1 s^2 + c_2 s + c_3} + \frac{c_5}{c_1 s^2 + c_2 s + c_3} \quad \text{[Equation 4]}$$
$$= \frac{c_4 s + c_5}{c_1 s^2 + c_2 s + c_3}$$

where $c_1$, $c_2$, $c_3$, $c_4$, $c_5$, etc. are coefficients which may be set (regardless of a positive value or a negative value), and s is a Laplace operator.

A braking force compensation amount TQ' which is determined and output by the second filter 22 using the feedback braking force $TQ4_{fb}$ as input is used to compensate for a post-filter application total braking force command TQ2 which is output of the first filter 21, and in the instant case, compensation may be performed by subtracting the braking force compensation amount TQ' from the post-filter application total braking force command TQ2.

As described above, a filter may be replaced by a transfer function model in the present disclosure. That is, in the present disclosure, a 'first filter' may be replaced by a 'first transfer function model', a 'second filter' may be replaced by a 'second transfer function model', and the 'post-filter application total braking force command' may be replaced by a 'post-transfer function model application total braking force command'.

Hereafter, a process in which a feedback braking force and a final total braking force are determined is described with reference to FIG. 7.

In FIG. 7, a feedback braking force $TQ4_{fb}$ is a feedback value of a final total braking force or a final total braking force command. When a braking force compensation amount TQ' is determined by the second filter 22 including the feedback braking force $TQ4_{fb}$ as input thereof, a post-filter application total braking force command TQ2 which is output of the first filter 21 is compensated for with the determined braking force compensation amount TQ', whereby a post-compensation total braking force command TQ3 is determined.

The braking devices 30 and 40 may be controlled based on the determined post-compensation total braking force command TQ3 (step S6 in FIG. 3). As various exemplary embodiments of the present disclosure, braking control that is configured to control the braking devices 30 and 40 of a vehicle in accordance with the post-compensation total braking force command TQ3 may be performed.

Braking control that is configured to control one braking device or simultaneously is configured to control a plurality of braking devices in accordance with the post-compensation total braking force command TQ3 may be performed. When a plurality of braking devices is simultaneously controlled, a braking force command for each of the braking devices may be determined by distributing braking forces from the post-compensation total braking force command TQ3, and the braking devices are simultaneously controlled in accordance with the braking force commands determined for the braking devices, respectively.

In the instant case, distribution of braking forces may be distribution of a regenerative braking force command and a friction braking force command, regenerative braking by the motor is controlled in accordance with the distributed regenerative braking force command, and operation of the friction braking device is controlled in accordance with the distributed friction braking force command.

While braking control that is configured to control the braking devices 30 and 40 in accordance with a post-compensation total braking force command TQ3 is performed (step S6 in FIG. 3), as described above, an error may be generated in the braking force which is actually generated at the wheel 60 due to unexpected external disturbance, etc.

In the instant case, the braking force which is actually finally generated at the wheel 60 by the braking devices 30 and 40 is a final total braking force TQ4. of course, when a plurality of braking devices 30 and 40 is mounted, the final total braking force TQ4 is the sum of braking forces that are actually applied to the wheel 60 by all of the braking devices.

As a result, TQ4 shown in FIG. 7, which is a final total braking force including an error in the various exemplary embodiments of the present disclosure, is a final total braking force including an unexpected error included in a desired total braking force value, that is, the total braking force command TQ3 and may be considered as a value which is the sum of the post-compensation total braking force command TQ3 and the error. That is, an error due to unexpected external disturbance, etc. exists between the post-compensation total braking force command TQ3 and the final total braking force TQ4 (|TQ4−TQ3|=error).

The final total braking force TQ4 is a value obtained as the result of final control at the current cycle. The final total braking force TQ4 is a feedback braking force $TQ4_{fb}$ which is used to determine a braking force compensation amount TQ' at the next control cycle, and as described above, becomes input of the second filter 22 for determining the braking force compensation amount TQ'. This means that the feedback braking force $TQ4_{fb}$ which is used to determine a braking force compensation amount TQ' at the current control cycle is a value obtained as the result of final control at the immediately previous control cycle.

As an example in which the post-compensation total braking force command TQ3 (the sum of braking force commands for respective braking devices) TQ3 and the final total braking force (the sum of braking forces) which is actually generated and applied to the wheel 60 are different, there may be a case in which overshoot is generated in a friction braking force due to an error in hydraulic pressure follow control according to temperature change at the friction braking device 30, a case in which a finally generated braking force is different from a model value due to an error in a friction coefficient model between a disc and a pad, so that the finally generated braking force is different from a braking force command, etc.

As described above, because the final total braking force TQ4 at the current control cycle may be used as a feedback braking force $TQ4_{fb}$ at the next control cycle, the controller 20 should know the magnitude of the final total braking force (feedback braking force), which may be achieved by detecting or estimating.

That is, a final total braking force which is actually applied to the wheel 60 may be a sensor detection value that the controller 20 knows through a sensor, or an estimation value of a braking force which is estimated in accordance with a predetermined estimation process by the controller 20. For example, the final total braking force TQ4 may be a motor torque estimation value which is estimated from inverter driving information, a final total braking torque estimation value compensated for with an amplification ratio or a gear ratio from a motor torque estimation value, or the like.

As described above, because a final total braking force is detected by a sensor or estimated through a predetermined estimation process rather than an command value, the final total braking force may be a value that the controller 20 knows in real time, and the current final total braking force TQ4 becomes a feedback braking force $TQ4_{fb}$ which is input of the second filter 22 at the next control cycle.

The post-compensation total braking force command TQ3, the final total braking force TQ4, and the feedback braking force $TQ4_{fb}$ in the various exemplary embodiments would be clearly discriminated and understood by those skilled in the art through the above description.

Next, various exemplary embodiments are an exemplary embodiment in which a difference between a post-compensation total braking force command TQ3 and a final total braking force TQ4 is generated by command intervention or an error intended by the controller 20. For example, the controller 20 may perform additional compensation or generate an intended command error on a post-compensation total braking force command TQ3 in accordance with a predetermined control logic, and a difference between the post-compensation total braking force command TQ3 and the final total braking force TQ4 may be generated by control intervention accompanied by additional compensation, an intended error, or the like.

For example, when additional control intervention is required due to specific reasons such as it is required to handle slip or it is required to increase/decrease torque in accordance with a vehicle posture control request, additional compensation may be performed on the post-compensation total braking force command TQ3 by the controller 20, and in the instant case, the difference between the post-compensation total braking force command TQ3 and the final total braking force TQ4 is an additional compensation amount.

In the exemplary embodiment of the present disclosure, TQ4 is a final total braking force command, the final total braking force command TQ4 is a feedback braking force TQ4$_{fb}$ which is input of the second filter 22 at the next control cycle and is used to determine a braking force compensation amount TQ' at the second filter 22. That is, the feedback braking force TQ4$_{fb}$ which is input of the second filter 22 at the current control cycle is a final total braking force command TQ4 determined at the immediately previous control cycle.

In the various exemplary embodiments of the present disclosure, braking force distribution that distributes a braking force command to each braking device may be performed on a post-compensation total braking force command TQ3 or a final total braking force command TQ4 in which an additional compensation command has intervened.

When braking force distribution is performed on a post-compensation total braking force command TQ3, control intervention such as additional compensation may be performed on the braking force commands distributed to braking devices, respectively, and then the sum of all of the braking force commands for the braking devices becomes the final total braking force command TQ4.

The controller 20 knows the final total braking force command TQ4 in both cases, and the final total braking force command TQ4 at the current control cycle is used as a feedback braking force TQ4$_{fb}$ which is input of the second filter 22 at the next control cycle.

Referring to FIG. 7, a first filter 21 which is a filter for removing or weakening a natural frequency is applied to a total requested braking force command TQ1 determined based on real-time vehicle driving information, and the reason of applying a filter for removing or weakening a natural frequency is for removing or weakening a component which may increase the natural frequency of a vehicle pitch motion existing in the shape of the total requested braking force command TQ1.

The natural frequency component of a vehicle pitch motion is included in a braking force command (braking torque command), the component becomes a main factor that causes a vehicle pitch motion when a vehicle is decelerated. However, when the component is removed by the first filter 21, there is no increasing component, so even though a pitch motion is generated, the pitch motion may be attenuated.

Referring to FIG. 7, a second filter 22 which is a filter for extracting or reinforcing a natural frequency is applied to a process of determining a braking force compensation amount TQ3 to compensate for a post-filter application total braking force command TQ2 which is output of the first filter 21, and the reason of applying a filter for extracting or reinforcing a natural frequency is for finding out the natural frequency component of a vehicle pitch motion which is being transmitted to a vehicle.

The main factor that transmits the natural frequency component of a vehicle pitch motion is in the step in which command intervention or error generation due to additional compensation, etc., and accordingly, an unexpected component increasing a vehicle pitch motion is transmitted to a vehicle. Therefore, it is required to extract the component from an actual transmission torque shape to trace the component in real time. Accordingly, a filter that can extract or reinforce a natural frequency component is used as the second filter 22.

Compensation is performed by subtracting the extracted increasing component from a post-filter application total braking force command in real time, which acts as a real-time pre-compensation strategy for the command intervention or error generation step which is being currently generated.

Figure 8A:
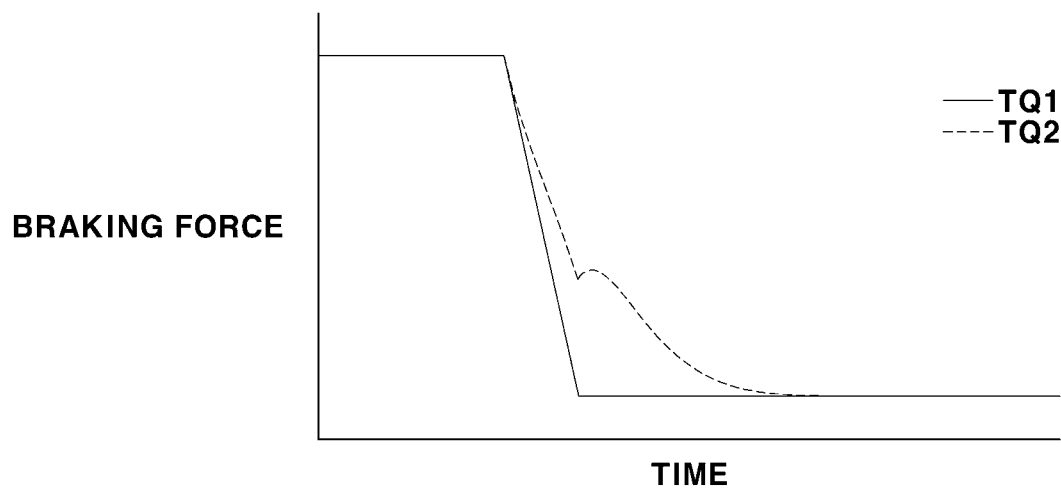
FIG. 8A, FIG. 8B, FIG. 8C, FIG. 8D and FIG. 8E are diagrams showing several example of a braking force command according to an exemplary embodiment of the present disclosure.

Meanwhile, FIG. 8A, FIG. 8B, FIG. 8C, FIG. 8D and FIG. 8E are views showing braking force commands of an exemplary embodiment of the present disclosure and a comparative example. FIG. 8A exemplifies a total requested braking force command TQ1 and a post-filter application total braking force command TQ2 obtained by applying a first filter 21, which is a filter for removing or weakening a natural frequency, to the total requested braking force command in the present disclosure. The post-filter application total braking force command TQ2 is the most ideal braking force command.

Figure 8B:
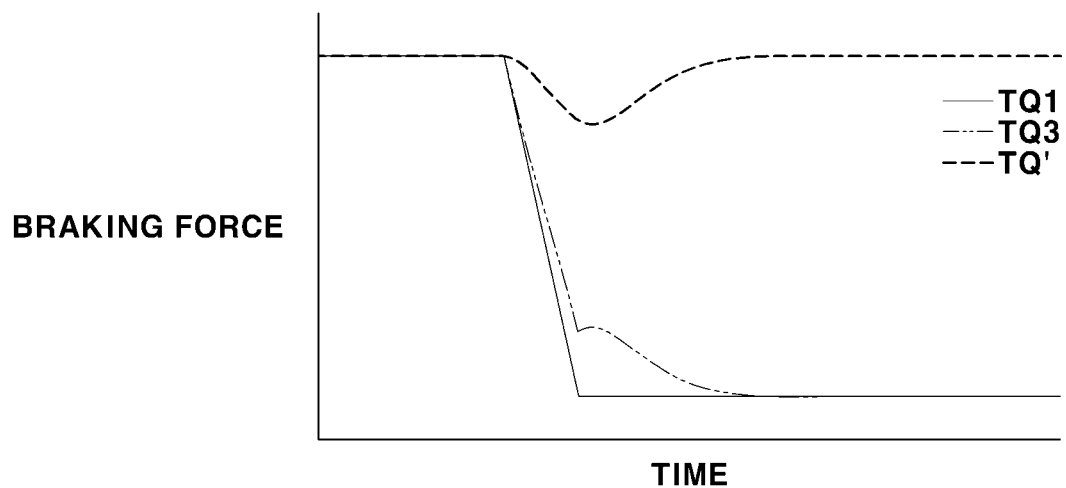

FIG. 8B shows a comparative example and exemplifies a total requested braking force command TQ1, a braking force compensation amount TQ' obtained by applying a second filter 22, which is a filter for extracting or reinforcing a natural frequency, to the total requested braking force command TQ1, and a post-compensation total braking force command TQ3 obtained by compensating for the total requested braking force command TQ1 using the braking force compensation amount TQ'.

Figure 8C:
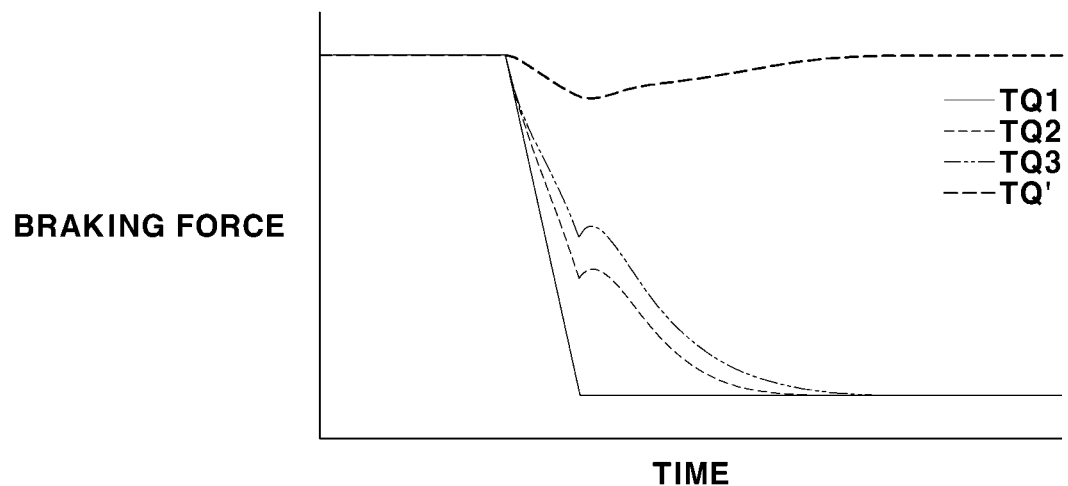

FIG. 8C is a view showing another exemplary embodiment of the present disclosure and exemplifies a total requested braking force command TQ1, a post-filter application total braking force command TQ2 obtained by applying a first filter 21, which is a filter for removing or weakening a natural frequency to the total requested braking force command TQ1, a braking force compensation amount TQ' obtained by applying a second filter 22, which is a filter for extracting or reinforcing a natural frequency, to the post-filter application total braking force command TQ2, and a post-compensation total braking force command TQ3 obtained by compensating for post-filter application total braking force command TQ2 using the braking force compensation amount TQ'.

As described above, in another exemplary embodiment of the present disclosure, unlike those shown in FIG. 6 and FIG. 7, the post-filter application total braking force command TQ2 at an immediately previous control cycle which is output of the first filter 21 and an ideal command may be used as input of the second filter 22 at a current control cycle for determining the braking force compensation amount TQ'.

That is, the post-filter application total braking force command TQ2 at an immediately previous control cycle may be used as a feedback braking force TQ$_{fb}$ which is input of the second filter 22 for determining the braking force compensation amount TQ' As a feedback braking force TQ$_{fb}$ at a current control cycle, the post-compensation total braking force command TQ3 at the immediately previous control cycle may be used to determine the braking force compensation amount TQ' as a feedback braking force TQ$_{fb}$ which is input of the second filter 22.

Figure 8D:
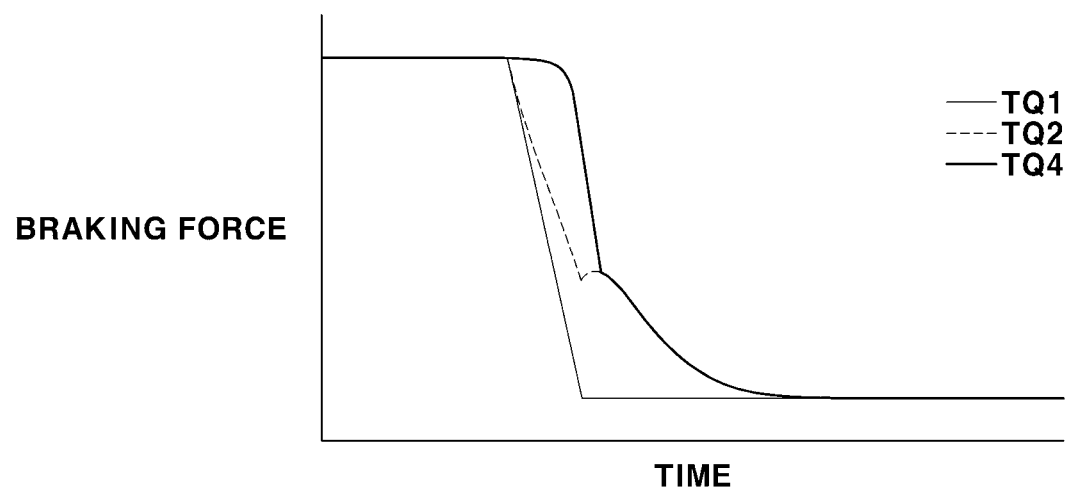
Figure 8E:
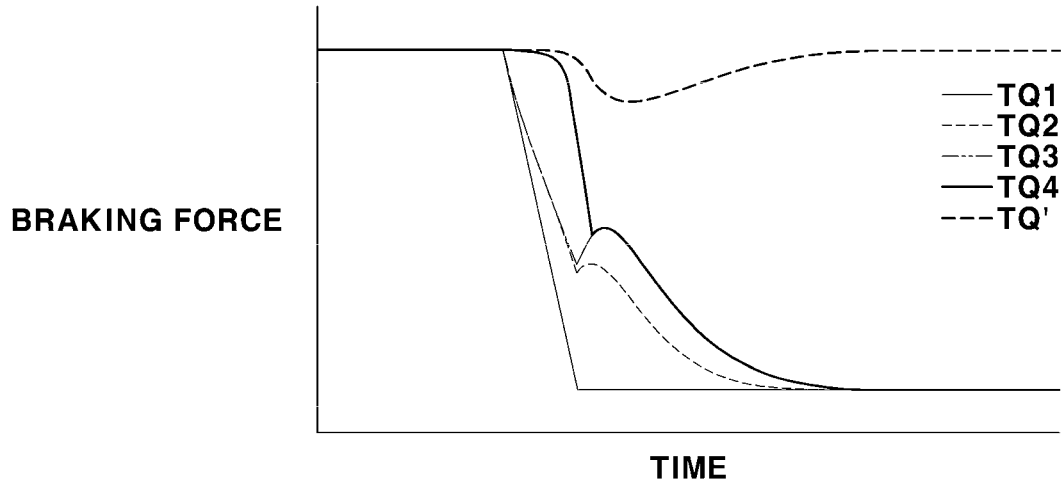

FIG. 8D exemplifies the total requested braking force command TQ1, the post-filter application total braking force command TQ2, and the final total braking force command TQ4 in FIG. 7 in the present disclosure, and FIG. 8E, as an exemplary embodiment of the present disclosure, shows the total requested braking force command TQ1, the post-filter application total braking force command TQ2, the post-compensation total braking force command TQ3, the final total braking force command TQ4, and the braking force compensation amount TQ' in FIG. 7. The closer to the post-filter application total braking force command TQ2 which is an ideal braking force command, the more the braking force commands may be considered as preferable braking force commands.

Figure 9:
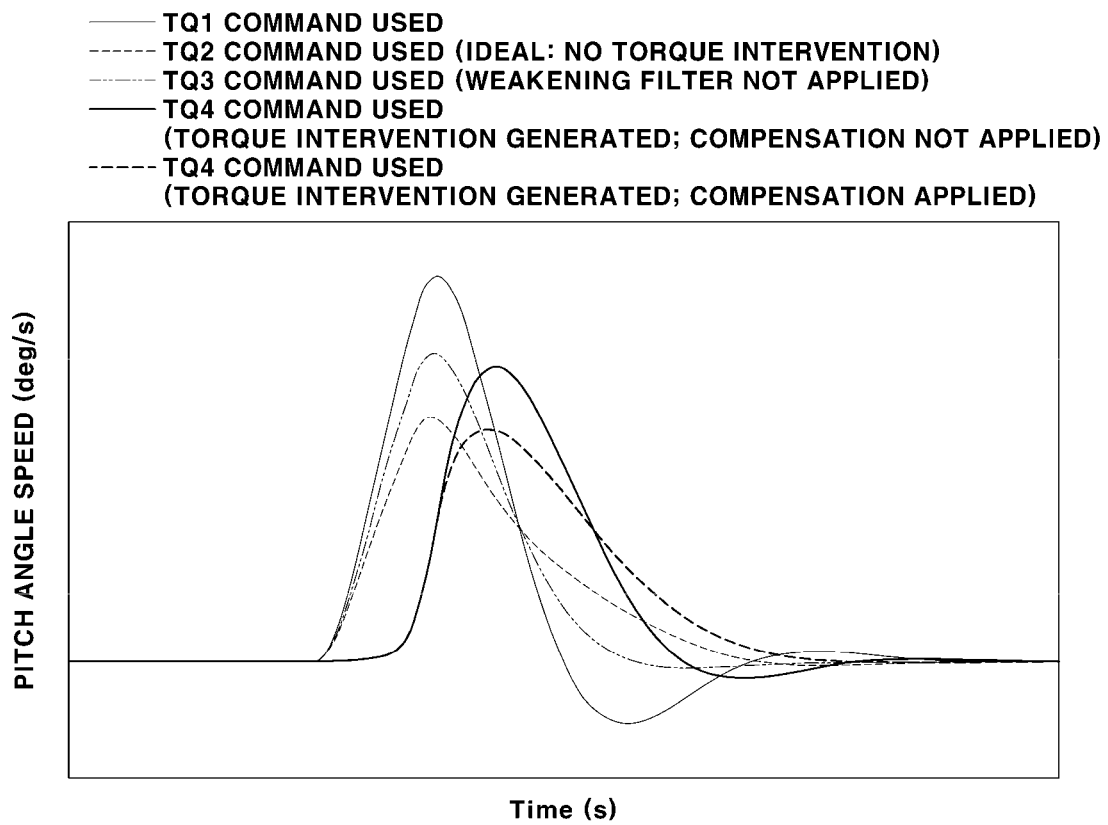
FIG. 9 is a diagram showing pitch angle speed states of an exemplary embodiment of the present disclosure and a comparative example, that is, comparing the states when several braking force commands are used.

Next, FIG. 9 is a diagram showing pitch angle speed states when a braking force command is used in an exemplary embodiment of the present disclosure and a comparative example. The following Table 1 shows a pitch angle speed difference and an improved level according to each used command.

In the following Table 1, the used command is a final command which is used to control all of braking devices and the pitch angle speed difference is the difference between a maximum value and a minimum value of a pitch angle speed (deg/s). Furthermore, the improved level shows the improved (reduced) ratio of the pitch angle speed in each Case with respect to the pitch angle speed in Case 1.

The difference of the pitch angle speed (deg/s) is greatly involved with a traction variation due to load movement in acceleration and deceleration, and the smaller the difference of the pitch angle speed, the easier the slip control and the riding comport security become. Differences of a pitch angle speed in control cases were compared through simulation, as shown in FIG. 9 and the following Table 1.

TABLE 1

| | Used command | Pitch angle speed difference (deg/s) | Improved level (%) |
|---|---|---|---|
| Case 1 | TQ1 command | 8.138 | Reference |
| Case 2 | TQ2 command (ideal: no torque intervention) | 4.519 | 44.5% |
| Case 3 | TQ3 command (weakening filter not applied) | 5.745 | 29.4% |
| Case 4 | TQ4 command (torque intervention generated; compensation strategy not applied) | 5.688 | 30.1% |
| Case 5 | TQ4 command (torque intervention generated; compensation strategy applied) | 4.251 | 47.8% |

The user commands were used as final total braking force commands for controlling a braking force of braking devices, and the driving devices were controlled using the total requested braking force command TQ1 and the post-filter application total braking force command TQ2 in each of Case 1 and Case 1.

In Case 3, a first filter 21 which is a filter for removing or weakening a natural frequency was not used, and when a braking force compensation amount was obtained by applying a second filter 22, which is a filter for extracting or reinforcing a natural frequency, to TQ3 which is the used command at an immediately previous control cycle (TQ3→TQ'), a total requested braking force command TQ1 at a current control cycle was compensated for using the obtained braking force compensation amount TQ' (TQ1→TQ3, TQ1−TQ'=TQ3) and the driving devices 30 and 40 were controlled using the compensated post-compensation total braking force command TQ3 (step S6 in FIG. 3).

In Case 4, when a post-filter application total braking force command TQ2 was obtained by applying the first filter 21, which is a filter for removing or weakening a natural frequency, to a total requested braking force command TQ1, additional compensation of the post-filter application total braking force command TQ2 was performed (TQ2→TQ4) without compensation for the post-filter application total braking force command, and the driving devices 30 and 40 were controlled using the additionally compensated final total braking force command TQ4 (step S5 in FIG. 3).

Case 5, as an exemplary embodiment of the present disclosure, shows the result of controlling the braking devices 30 and 40 using a final total braking force command TQ4 that had undergone all of the processes (of applying both the first filter and the second filter) shown in FIG. 7. The improved level in Case 5 was the largest.

Figure 10:
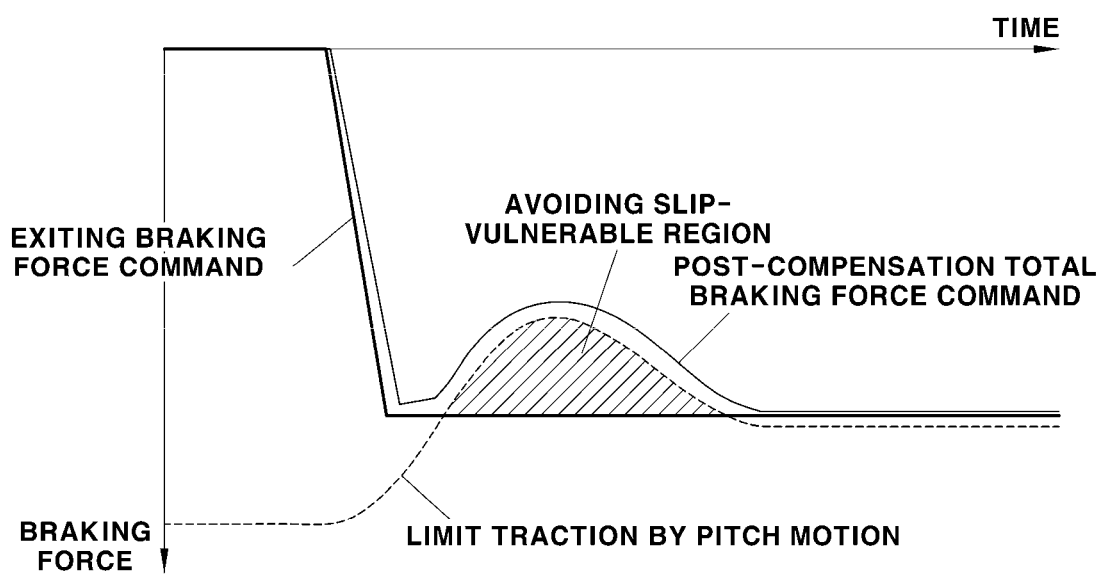
FIG. 10 and FIG. 11 are diagrams illustrating the effects of braking control according to an exemplary embodiment of the present disclosure.
Figure 11:
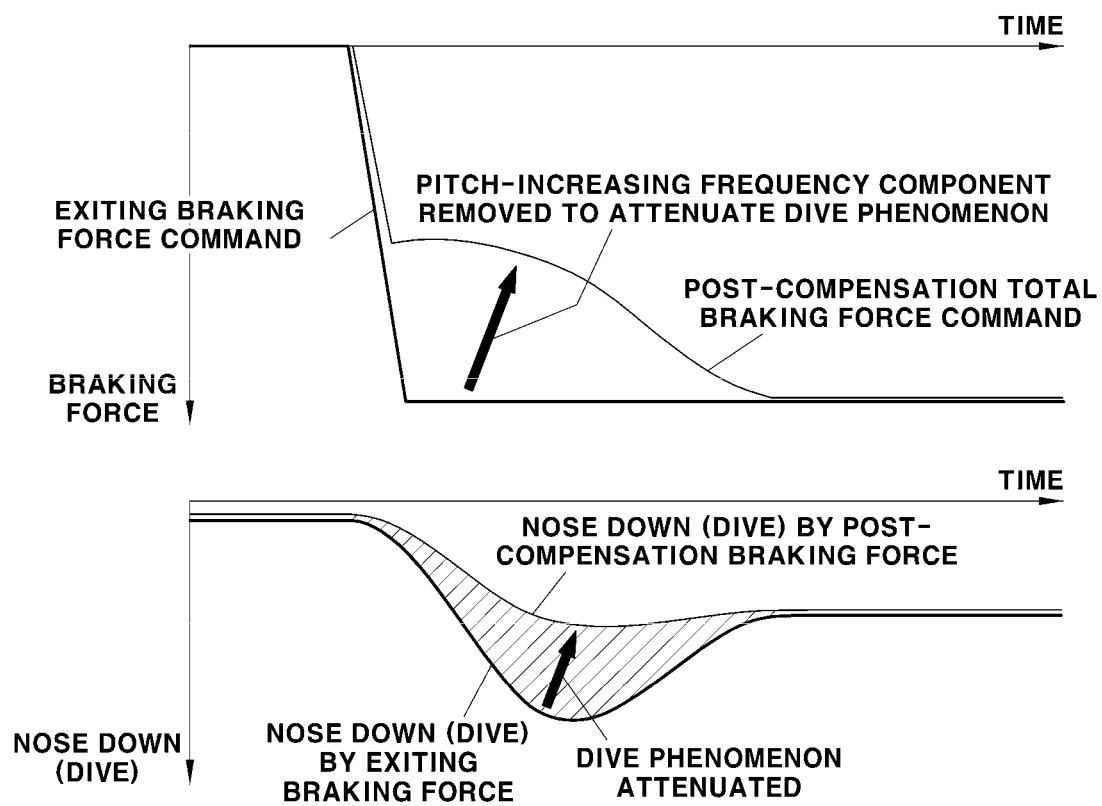

Next, FIG. 10 and FIG. 11 are diagrams illustrating the effects of braking control according to an exemplary embodiment of the present disclosure.

As shown in FIG. 10, when braking force command compensation using a filter, which removes and weakens a corresponding natural frequency component in a braking force command, and braking control according to a post-compensation total braking command are performed in consideration of the natural frequency characteristic of a vehicle suspension pitch motion (pitch motion), it is possible to perform braking force compensation control before a wheel slip occurs.

Next, as shown in FIG. 11, in consideration of the natural frequency characteristic of a vehicle suspension pitch motion, when braking force command compensation using a filter, which removes or weakens a corresponding natural frequency component in a braking force command, and braking control according to a post-compensation total braking force command are performed, it is possible to attenuate an excessive suspension pitch motion of a vehicle. That is, it is possible to obtain an effect of attenuating nosedown (dive) phenomenon in comparison to the braking control according to a braking force command of the related art.

Therefore, according to the method for controlling braking, it is possible to effectively prevent a wheel slip by only applying a software-related method without changing the hardware or increasing the manufacturing cost of a vehicle and it is possible to increase durability of tires through prevention of a wheel slip. Furthermore, it is possible to achieve an effect of improving braking performance of a vehicle by maximally using suspension pitch motion limit traction and an effect of improving riding comfort by attenuating a suspension pitch motion.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program commands which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program command include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling braking of a vehicle, the method comprising:
   determining a natural frequency of a vehicle suspension pitch motion according to characteristics of a suspension of the vehicle;
   providing a first filter configured to remove or decrease the natural frequency component of the vehicle suspension pitch motion and a second filter configured to extract or increase the natural frequency component of the vehicle suspension pitch motion, to a controller of the vehicle;
   determining, by the controller, a total requested braking force command based on vehicle driving information collected while the vehicle is driven;
   determining, by the controller, a post-filter application total braking force command through a process by the first filter including the determined total requested braking force command as input thereof;
   determining, by the controller, a braking force compensation amount through a processing procedure by the second filter including a feedback braking force, which is a feedback value of a braking force of the vehicle, as input thereof; and
   compensating, by the controller, for the post-filter application total braking force command using the braking force compensation amount, and controlling a braking force, which is applied to a wheel of the vehicle by a braking device of the vehicle, using a post-compensation total braking force command.

2. The method of claim 1, further including:
   constructing a transfer function modeled to determine and output state information related to the vehicle suspension pitch motion using a variable showing a vehicle driving state as input thereof,
   wherein the natural frequency of the vehicle suspension pitch motion is determined as a natural frequency of the constructed transfer function.

3. The method of claim 2, wherein the state information related to the vehicle suspension pitch motion is a suspension pitch angle, which shows a longitudinal slope of the vehicle due to extension or contraction of a front wheel suspension or a rear wheel suspension, or a tire vertical load in the vehicle driving state.

4. The method of claim 1, wherein the first filter is selected from:
   a low pass filter and a high pass filter including a cut-off frequency corresponding to the natural frequency of the vehicle suspension pitch motion; and
   a notch filter including a center frequency corresponding to the natural frequency of the vehicle suspension pitch motion.

5. The method of claim 4,
   wherein the natural frequency of the vehicle suspension pitch motion is set to be a same as or higher than a natural frequency of the low pass filter, wherein the natural frequency of the vehicle suspension pitch motion is set to be a same as or lower than a natural frequency of the high pass filter, and wherein the natural frequency of the vehicle suspension pitch motion exists in a stop bandwidth of the notch filter.

6. The method of claim 1, wherein the second filter is selected from:

a low pass filter and a high pass filter including a cut-off frequency corresponding to the natural frequency of the vehicle suspension pitch motion; and a band pass filter including a center frequency corresponding to the natural frequency of the vehicle suspension pitch motion.

7. The method of claim 6, wherein the natural frequency of the vehicle suspension pitch motion is set to be a same as or lower than a natural frequency of the low pass filter, wherein the natural frequency of the vehicle suspension pitch motion is set to be a same as or higher than a natural frequency of the high pass filter, and wherein the natural frequency of the vehicle suspension pitch motion exists in a pass band of the band pass filter.

8. The method of claim 1, wherein the second filter has a configuration in which a plurality of filters configured to extract or increase the natural frequency component of the vehicle suspension pitch motion is connected in parallel, and wherein the controller is configured to apply a preset gain value to a braking force compensation amount, which is output of each of the filters connected in parallel, and utilizes a sum of braking force compensation amounts, to which the gain value has been applied, as a braking force compensation amount for compensating the post-filter application total braking force command.

9. The method of claim 1, wherein the post-filter application total braking force command at an immediately previous control cycle is used as input of the second filter at a current control cycle as the feedback braking force which is a feedback value of the braking force of the vehicle.

10. The method of claim 1, wherein the post-compensation total braking force command at an immediately previous control cycle is used as input of the second filter at a current control cycle as the feedback braking force which is a feedback value of the braking force of the vehicle.

11. The method of claim 1, wherein operation of the braking device is controlled in accordance with the post-compensation total braking force command in the controlling of the braking force which is applied to the wheel of the vehicle, and wherein a real-time sensor detection value or estimation value of a final total braking force which is actually applied to the wheel by the braking device is used as input of the second filter as the feedback braking force which is a feedback value of the braking force of the vehicle in the determining of the braking force compensation amount.

12. The method of claim 1, wherein additional compensation is performed on the post-compensation total braking force command in accordance with a predetermined control logic and operation of the braking device is controlled in accordance with the additionally compensated final total braking force command in the controlling of the braking force which is applied to the wheel, and wherein the additionally compensated final total braking force command at an immediately previous control cycle is used as input of the second filter at a current control cycle as the feedback braking force which is a feedback value of the braking force of the vehicle in the determining of the braking force compensation amount.

13. A method for controlling braking of a vehicle, the method comprising:

determining a natural frequency of a vehicle suspension pitch motion according to characteristics of a suspension of the vehicle;

providing a first transfer function model configured to remove or decrease the natural frequency component of the vehicle suspension pitch motion and a second transfer function model configured to extract or increase the natural frequency component of the vehicle suspension pitch motion, to a controller of the vehicle;

determining, by the controller, a total requested braking force command based on vehicle driving information collected while the vehicle is driven;

determining, by the controller, a post-transfer function model application total braking force command through a processing procedure by the first transfer function model including the determined total requested braking force command as input thereof;

determining, by the controller, a braking force compensation amount through a processing procedure by the second transfer function model including a feedback braking force, which is a feedback value of a braking force of the vehicle, as input thereof; and compensating, by the controller, for the post-transfer function model application total braking force command using the braking force compensation amount, and controlling a braking force, which is applied to a wheel of the vehicle by a braking device of the vehicle, using a post-compensation total braking force command.

14. The method of claim 13, further including:

constructing a transfer function modeled to determine and output state information related to the vehicle suspension pitch motion using a variable showing a vehicle driving state as input thereof, wherein the natural frequency of the vehicle suspension pitch motion is determined as a natural frequency of the constructed transfer function.

15. The method of claim 14, wherein the state information related to the vehicle suspension pitch motion is a suspension pitch angle, which shows a longitudinal slope of the vehicle due to extension or contraction of a front wheel suspension or a rear wheel suspension, or a tire vertical load in the vehicle driving state.

16. The method of claim 13, wherein the post-transfer function model application total braking force command at an immediately previous control cycle is used as input of the second transfer function model at a current control cycle as the feedback braking force which is the feedback value of the braking force of the vehicle.

17. The method of claim 13, wherein the post-compensation total braking force command at an immediately previous control cycle is used as input of the second transfer function model at a current control cycle as the feedback braking force which is the feedback value of the braking force of the vehicle.

18. The method of claim 13, wherein operation of the braking device is controlled in accordance with the post-compensation total braking force command in the controlling of the braking force which is applied to the wheel, and wherein a real-time sensor detection value or estimation value of a final total braking force which is actually applied to the wheel by the braking device is used as input of the second transfer function model as the feedback braking force which is a feedback value of the braking force of the vehicle in the determining of the braking force compensation amount.

19. The method of claim 13,
wherein additional compensation is performed on the post-compensation total braking force command in accordance with a predetermined control logic and operation of the braking device is controlled in accordance with the additionally compensated final total braking force command in the controlling of the braking force which is applied to the wheel, and
wherein the additionally compensated final total braking force command at an immediately previous control cycle is used as input of the second transfer function model at a current control cycle as the feedback braking force which is a feedback value of the braking force of the vehicle in the determining of the braking force compensation amount.

\* \* \* \* \*